United States Patent
Sukyas et al.

(10) Patent No.: US 12,394,407 B2
(45) Date of Patent: Aug. 19, 2025

(54) SYSTEM AND METHOD FOR TRAINING DOMAIN-SPECIFIC SPEECH RECOGNITION LANGUAGE MODELS

(71) Applicant: VIQ Solutions Inc., Mississauga (CA)

(72) Inventors: Vahram Edward Sukyas, Los Angeles, CA (US); Jeffrey G. Hopkins, Lincoln, RI (US); Sebastien Paré, Mississauga (CA); Phani Kumar Srinivas Savatham, Telangana (IN); Sateesh Puvvalla, Telangana (IN)

(73) Assignee: VIQ Solutions Inc., Mississauga (CA)

( * ) Notice: Subject to any disclaimer, the term of this patent is extended or adjusted under 35 U.S.C. 154(b) by 251 days.

(21) Appl. No.: 18/322,051

(22) Filed: May 23, 2023

(65) Prior Publication Data
US 2024/0395243 A1 Nov. 28, 2024

(51) Int. Cl.
*G10L 15/26* (2006.01)
*G10L 15/06* (2013.01)

(52) U.S. Cl.
CPC .......... *G10L 15/063* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 7,191,133 B1 * | 3/2007 | Pettay | G06Q 10/06398 |
| | | | 379/265.06 |
| 7,590,536 B2 * | 9/2009 | Bates | G10L 15/197 |
| | | | 704/231 |
| 10,204,621 B2 * | 2/2019 | Cui | G10L 15/075 |
| 10,210,860 B1 * | 2/2019 | Ward | G06N 3/044 |
| 10,867,595 B2 * | 12/2020 | Sriram | G06N 3/044 |
| 11,423,312 B2 * | 8/2022 | Choi | G06N 3/082 |
| 2021/0120121 A1 * | 4/2021 | McCourt | G10L 15/197 |
| 2021/0165976 A1 * | 6/2021 | Lee | G06F 40/58 |
| 2022/0059077 A1 * | 2/2022 | Thomson | G10L 15/065 |
| 2024/0153508 A1 * | 5/2024 | Moritz | G10L 17/06 |
| 2024/0203399 A1 * | 6/2024 | Stooke | G10L 15/065 |

* cited by examiner

*Primary Examiner* — Neeraj Sharma
(74) *Attorney, Agent, or Firm* — Jeffri A. Kaminski; Venable LLP

(57) ABSTRACT

Systems, methods, and computer-readable storage media for speech recognition, and more specifically to training domain or accent-specific speech recognition language models. The system can receive a starting ASR (Automated Speech Recognition) neural network model configured to receive audio in the language and generate a starting transcript of the audio. The system can also receive a request to generate a specialized version of the starting ASR neural network model. Based on the request, the system can execute an analysis of the audio, resulting in timestamps and a confidence of each word in the audio. The system can then execute the starting ASR neural network model, resulting in a starting transcript. The system can then generate training data using the timestamps, confidences, and the starting transcript, and train an updated ASR based on the training data, resulting in the specialized version of the starting ASR neural network model.

20 Claims, 4 Drawing Sheets

SYSTEM AND METHOD FOR TRAINING DOMAIN-SPECIFIC SPEECH RECOGNITION LANGUAGE MODELS

BACKGROUND

1. Technical Field

The present disclosure relates to speech recognition, and more specifically to training Domain-Specific Language Models (DSLM's).

2. Introduction

Commercial and Open Source Automatic Speech Recognition (ASR) engines receive audio inputs (e.g., an audio file, a video having an audio track, and/or a live audio stream) and produce a written transcript of that audio. ASR engines are trained on vast amounts of audio and textual data and aim to recognize as many spoken words as they possibly can. However, such models are often limited in their ability to recognize domain-specific audio, or speech spoken by an individual with a heavy accent.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a starting ASR (Automated Speech Recognition) neural network model for a language, the starting ASR neural network model configured to receive an audio file in the language and generate a starting transcript of the audio file; receiving, at the computer system, a request to generate a specialized version of the starting ASR neural network model, the specialized version having training for a predetermined category of audio; based on the request, executing an analysis of the audio file via at least one processor of the computer system, resulting in timestamps associated with each word in the audio file and a confidence of the each word; executing, via the at least one processor, the starting ASR neural network model on the audio file using an ASR architecture, resulting in the starting transcript; generating, via the at least one processor, training data based on: the timestamps of each word; the confidence of each word; and the starting transcript; and training, via the at least one processor, an updated ASR neural network model using the training data, resulting in the specialized version of the starting ASR neural network model.

A system configured to perform the concepts disclosed herein can include: at least one processor; and a non-transitory computer-readable storage medium having instructions stored which, when executed by the at least one processor, cause the at least one processor to perform operations comprising: receiving a starting ASR (Automated Speech Recognition) neural network model for a language, the starting ASR neural network model configured to receive an audio file in the language and generate a starting transcript of the audio file; receiving a request to generate a specialized version of the starting ASR neural network model, the specialized version having training for a predetermined category of audio; based on the request, executing an analysis of the audio file, resulting in timestamps associated with each word in the audio file and a confidence of the each word; executing the starting ASR neural network model on the audio file using an ASR architecture, resulting in the starting transcript; generating training data based on: the timestamps of each word; the confidence of each word; and the starting transcript; and training an updated ASR neural network model using the training data, resulting in the specialized version of the starting ASR neural network model.

A non-transitory computer-readable storage medium configured as disclosed herein can have instructions stored which, when executed by at least one processor, cause the at least one processor to perform operations which include: receiving a starting ASR (Automated Speech Recognition) neural network model for a language, the starting ASR neural network model configured to receive an audio file in the language and generate a starting transcript of the audio file; receiving a request to generate a specialized version of the starting ASR neural network model, the specialized version having training for a predetermined category of audio; based on the request, executing an analysis of the audio file, resulting in timestamps associated with each word in the audio file and a confidence of the each word; executing the starting ASR neural network model on the audio file using an ASR architecture, resulting in the starting transcript; generating training data based on: the timestamps of each word; the confidence of each word; and the starting transcript; and training an updated ASR neural network model using the training data, resulting in the specialized version of the starting ASR neural network model.

DETAILED DESCRIPTION

Figure 1:
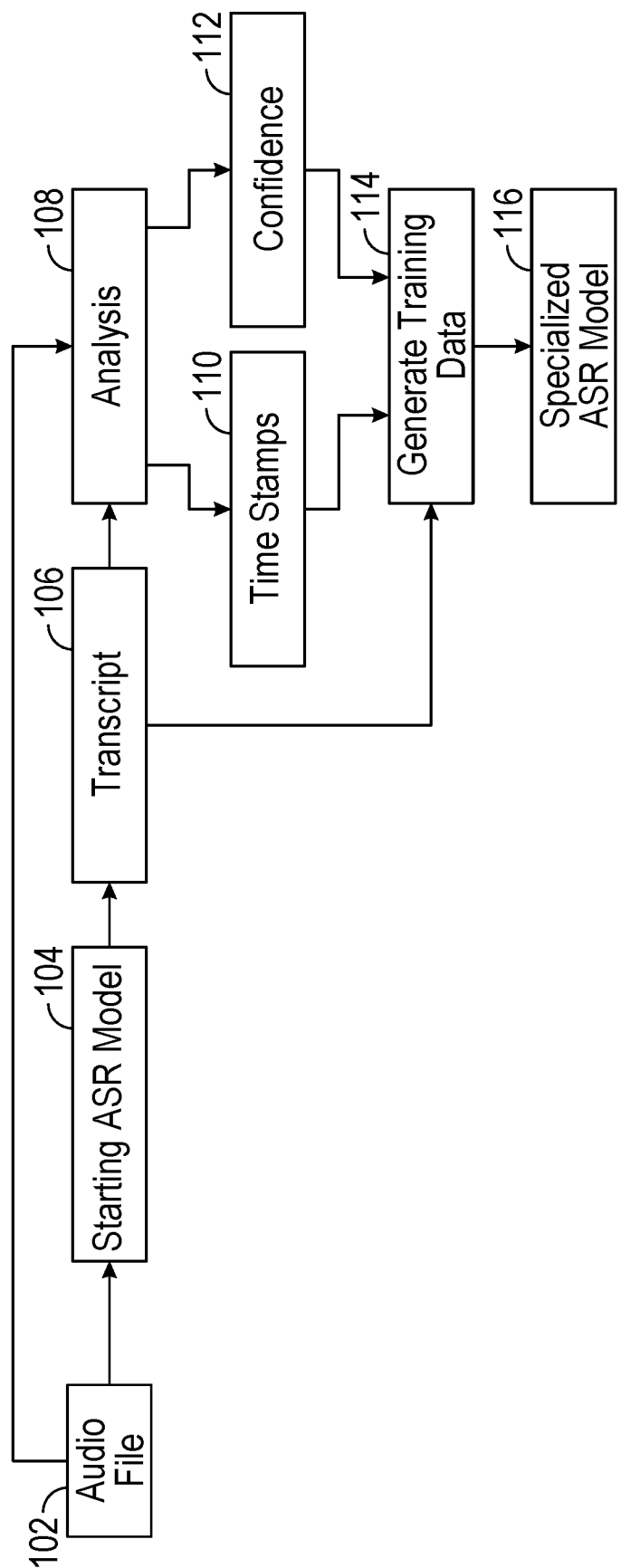
FIG. 1 illustrates an example process of generating a DSLM.

Various embodiments of the disclosure are described in detail below. While specific implementations are described, this is done for illustration purposes only. Other components and configurations may be used without parting from the spirit and scope of the disclosure.

Because available ASR models are often limited in their ability to recognize domain-specific audio, or speech spoken by an individual with a heavy accent, systems configured as disclosed herein can be used to generate specialized ASR models, which can provide increased accuracy when transcribing such domain-specific and/or accented audio to text. Systems configured as disclosed herein can use a previously trained (generic) ASR model and train the previously trained ASR model to become a domain-specific ASR model (or, if the previously trained ASR model is already a domain-specific ASR model, the updated model can be a more specialized version than the original, previously trained ASR model). Likewise, in some configurations, the system can also receive human corrections to previously generated speech recognition draft transcriptions, and use those human made corrections to update, score, or otherwise modify ASR models.

The resulting specialized ASR model can be particularly useful where users require transcription of domain-specific terms, require transcriptions with specific formatting requirements for a given spoken word, or require detection of specific words/accents/dialects/slang from different regions, etc. These requirements may also be conflicting. For example, one user might want the number "3" to be represented numerically, while another user may want the number to be represented in text form. These requirements can sometimes be contextual (e.g., words might need to be normalized, inverse normalized, capitalized, etc., depending on the context they are spoken in). Because of this, the ability to create ASR models which address the specific needs of the user are needed.

Consider the following example. The system obtains a generic, open-source ASR model. This generic, open-source ASR model can be "generic" in the sense that it is not trained using domain-specific, data, but instead is trained using a large dataset of diverse audio. The generic, open-source ASR model can also be a multi-task model that can perform multilingual speech recognition as well as speech translation and language identification. Upon receiving a request from a user to generate a specialized ASR model for a given domain, the system disclosed herein can use the generic, open-source ASR model as a starting point, generate a transcript of audio using that generic, open-source ASR model, and analyze the resulting transcript. Non-limiting examples of the data which that analysis can produce can include time stamps indicating where, within the audio, each identified word begins and ends (i.e., a beginning time stamp and an ending time stamp), a confidence score of each identified word (e.g., the system is 95% confident in the accuracy of a given word), the identified word in a string format, a speaker identification, and/or a paragraph indication. In some configurations, the analysis process can include the use of human transcriptionists who serve as document editors. These transcriptionists will listen carefully to the audio and ensure that it matches the words founds in an ASR draft transcript, and that those words are formatted according to the user's requirements.

An example of data associated with a single word in the analysis can be:

```
{
    "word": "the",
    "confidence": "0.99",
    "start": 687580,
    "end": 687800,
    "speaker": "S1",
    "channel": "1",
    "paragraph": false,
    "alternateWords": [ ]
}
```

In some circumstances the transcriptionists may add (or remove) words to the transcription. As the transcriptionist makes changes to the ASR draft to correct any errors, the transcription file can change accordingly. For example, if words are missing from the transcript, the data associated with the transcript (containing the start and stop times, for example) would contain a new word that doesn't have a corresponding start and end audio position, but the surrounding words maintain those timings. When the transcript is ready for delivery to the user, a final data file can be created according to any requirements made by the user.

In order to train the generic, open-source ASR model, the system can place a request into a queue (e.g., a work request queue with a cloud-computing service provider, or another computer system executing the training process) with the path to the transcript, the audio for which the transcript was generated, a job identification (if provided), and any information about the transcript analysis. An application instance of the computing system can then consume and process each request and do the following. Please note: in certain configurations one or more of the presented steps may be removed, or the order of their processing may be changed, as required for a particular configuration.

(1) The application instance can download the final transcript (preferably in an HTML format) along with the original audio file. The audio file can be resampled, if necessary.

(2) The Application instance contains a specialized parser that knows how to separate speaker labels based on speech runs. The application instance finds all sentences within the audio file/transcription that a) have a clear beginning timestamp and ending timestamp and b) are under a predetermined amount of time (e.g., ten seconds, thirty seconds, etc.). For any segments that match those conditions, audio markers and the corresponding text are saved in memory. If, for example, a word at the very beginning of a sentence was missed by the ASR engine and a transcriptionist had to add it in, the parser would not detect that sentence as a valid sample that it can automatically grab because a word was inserted at the beginning that didn't have a corresponding audio condition. If a word gets added into the middle of the sentence, the parser can successfully pick it up if (1) the first and last word of the sentence has correct audio timestamps and (2) the difference between the end time of the last word and the start time of the first word is under a predetermined amount of time (e.g., ten seconds, thirty seconds, etc.).

(3) The application instance can then scan through the audio start/end positions, split the audio file into distinct files according to the markers obtained in step (2) above, and write those files to the server's (or other computing device) storage.

(4) The generic, open-source ASR model is then run against the audio fragments of the files and compared to the corresponding text from the final transcript. The output is compared to both normalized and de-normalized versions of the text, and a WER (Word Error Rate) is generated against both the normalized and de-normalized versions of the text. This step provides confidence (without human verification) that the audio sample is (or is not) representative of the audio sample, thereby allowing the system to determine thresholds for incorporating any given fragment into the model training and test sets.

(5) The application instance can generate an array of data (in some instances, this can be a CSV file, a PARQUET file, or other similar file format). An example of the array of data can be found in Table 1. Please note that the data provided is exemplary only, and actual implementations may contain more or fewer data fields.

TABLE 1

| | |
|---|---|
| System | The system that generated the parquet file |
| Job ID | The job identifier |
| Tenancy | In a multi-tenant system, the tenant within the system the audio file originated from |
| Audio Fragment | The path to the audio file fragment in storage |

TABLE 1-continued

| | |
|---|---|
| Location | (cloud or otherwise) |
| Transcript text | The corresponding text for the audio fragment (from the final transcript) |
| Audio Fragment WER (Standard) | The WER of the fragment (based on comparing the final transcript text to the ASR output from the audio fragment) |
| Audio Fragment WER (Normalized) | The normalized WER of the fragment (based on comparing the normalized final transcript text to the normalized ASR output from the audio fragment) |
| Audio Fragment CER (Standard) | The CER (Character Error Rate) of the fragment (based on comparing the final transcript text to the ASR output from the audio fragment) |
| Audio Fragment CER (Normalized) | The normalized CER of the fragment (based on comparing the normalized final transcript text to the normalized ASR output from the audio fragment) |
| Segment Bookend Match | Do the first and/or last words from the final transcript fragment match the ASR output? Returns "both" if both"ends match, "first" if only the first word matches, "last" if only the last word matches, and "False" if neither ends match |
| Audio Position | Start and end time of the audio (from within the original audio file) |
| Audio Duration | The length of the audio segment in milliseconds |
| Confidence Score | The confidence score from running ASR against the audio fragment |
| Data Classification(s) | Whether the segment has any restricted/sensitive information (and if so, the type(s) of restricted information it has) |
| Overlapping Speech Regions | An array of timestamps where overlapping speech was detected |
| Voice Regions | An array of timestamps where voice activity was detected |
| Number of Speakers | The number of speakers (and their timings) detected in the audio segment |
| Speaker Embeddings | A vector representation of the speakers in the audio sample |
| Human Verified | An indication of whether a human has audited the audio fragment or not; defaults to "False" |
| Organization | An indicator of the organization that submitted the original audio |
| Industry | The vertical that the Organization is in (e.g., Law Enforcement, Insurance, Legal, etc.) |
| Number of Speakers (Original Audio) | The number of speakers identified in the final transcript (from the system) |
| Languages Spoken | Languages spoken in the original audio file (not the segment) |
| Job Delivered Date | Date/Time when the transcript was delivered to the client |
| Original Document WER | The overall WER of the original ASR draft compared to the final transcript |
| Original Document Confidence | The overall average token confidence score from the original ASR draft |

Once the array of data is generated, it can be placed into files and subsequently placed into a "staging" bucket, or other temporary file storage system, organized by the system ID, the tenant ID, and/or the job ID. In some configurations, a serverless, interactive analytics system can query the staging bucket to optimize the speed of future interactions.

(6) As the array of data files are stored and placed in the staging bucket, an INNER JOIN query can be executed by the system using the Job ID and/or the Tenant ID against the system data stored in a database, thereby gathering additional metadata about the job (see rows Organization, Industry, Number of Speakers, Languages Spoken, Job Delivered Date, Original Document WER, and Original Document Confidence in Table 1), resulting in aggregated text files joined together based on job information (and/or other factors).

(7) Data classification technology can be used to scan the text of the aggregated text files to verify that there are no private/sensitive data within the text fragment (such as, but not limited to, personally identifiable information such as social security numbers).

(8) The system can execute a speaker identification algorithm (or call to a third-party speaker identification algorithm) to determine how many speakers are in the audio sample and generate speaker embeddings. The system can also check if the audio fragments (stored as the aggregated word files) contain overlapping speech, and identify any non-voice regions within the audio. The information within the aggregated text files can be updated based on the identification of any overlapping speech and/or the identification of any non-voice regions within the audio.

(9) The finished aggregated text files can be stored within a database engine organized by the industry, the organization, the year, the month, and the date, or any other identifying data. The stored array of data can be further modified to optimize the speed of future queries.

Once the aggregated text files for the audio have been generated, they can be used to train the generic, open-source ASR model, resulting in a domain-specific version of the ASR model which is trained to have higher recognition rates with respect to a specific category of speech (e.g., domain-specific speech and/or accented speech). More specifically, the aggregated text files can be queried to form testing and training datasets.

Consider the following non-limiting examples of querying specific datasets for testing and training: In one example, the system can load documents from the U.S. Insurance industry that are English only, where the original document WER was above 0.30, but only for audio samples with a normalized WER below 0.10 (this would potentially load samples that have repetitive punctuation or text normalization errors that need to be output correctly in the future). In another example, the system can load Dutch language fragments from all verticals within the aggregated text files to improve the overall word accuracy of a global Dutch language model. In yet another example, the system can load fragments for a given Job ID that have a mixture of English and Spanish, which can then be used to train the generic, open-source ASR model's encoder and decoder to recognize mixed language audio files and represent the Spanish as Spanish and the English as English (thus forming a "two-languages in one model" output model). Finally, as another example, the system can load fragments with no overlapping speech regions from Australia to train both the generic, open-source ASR model's encoder and decoder to better recognize Australian accents and decode them into Australian English (e.g., favour vs. favor, etc.).

The output of a query can be a new array of data (e.g., Table 1), which can be loaded into a dataset object. This dataset object can then be split into testing/training data, which can then be used to train a new, domain specific ASR model. Upon completion of the training process, the model can be executed using the test dataset with the results loaded into a leaderboard, allowing the model's effectiveness to be compared with the generic, open-source ASR model (or another starting model), if needed.

In some configurations, the system, upon receiving audio and generating a transcript using the generic, open-source ASR, may determine that the confidence/quality of the transcription fails to meet a predetermined quality level. In such cases, the system may identify a category to which the audio belongs (e.g., the system may determine that the audio contains speakers discussing a specific domain, or speaking with a given accent). In such instances, the system can self-initiate the process for generating a specialized ASR model for the category associated with the audio. For example, if the transcription quality was poor (i.e., below the predetermined quality level), the system may determine it was because a generic, open-source ASR model was used to transcribe audio of an individual with a strong accent, and may initiate the generation of a specialized ASR model specific to that accent. Once generated, the system can then compare the resulting transcription(s) using the specialized ASR model against the generic, open-source model transcription, to determine if the specialized ASR model provides improved results (e.g., improved confidence in the transcription). The overall confidence score of a transcription can be calculated by averaging the confidence score of each word in the transcript.

In some instances, the system may already have one or more domain-specific ASR models for a given category, but because the quality of transcriptions using the existing model(s) are not perfect, the system may initiate creation of additional domain-specific models. This creation of the additional domain-specific models can, for example, be initiated upon acquiring additional training data (i.e., upon receiving additional audio which is associated with a given category, the system may retrain the existing model(s) to obtain a better model). In such cases, rather than beginning with a generic, open-source ASR model, the system can begin the improvement process by training on top of the previous domain-specific ASR model. The system can then compare the results of the new model(s) to the previous models, and use the comparison to determine which of the models should be used in the future.

FIG. 1 illustrates an example process of generating a specialized domain-specific ASR model. In this example, the system receives an audio file 102. The audio file 102 can be, for example, recorded audio, a video with an audio component, an audio stream, or live audio. The system can use a starting ASR model 104 (which can be a generic, open-source ASR model; a category-specific ASR model; a language or accent specific ASR model; or any other custom-made ASR model) to generate a transcript 106 of the audio file 102. The audio file 102 and the transcript 106 can be analyzed 108, resulting in time stamps 110 (e.g., beginning and ending times for when individual words appear in the audio file 102) and confidence 112 of the transcription 106 (which can be made for each word detected). The transcript 106, the time stamps 110, and the confidence scores 112 can be used to generate training data 114. In some configurations, the original audio file 102 can also be included as part of the training data. The training data can then be used to train a new, specialized ASR model 116. This specialized ASR model 116 can then be compared to the starting ASR model 104 and, if it provides increased accuracy, used in future transcription jobs.

Figure 2:
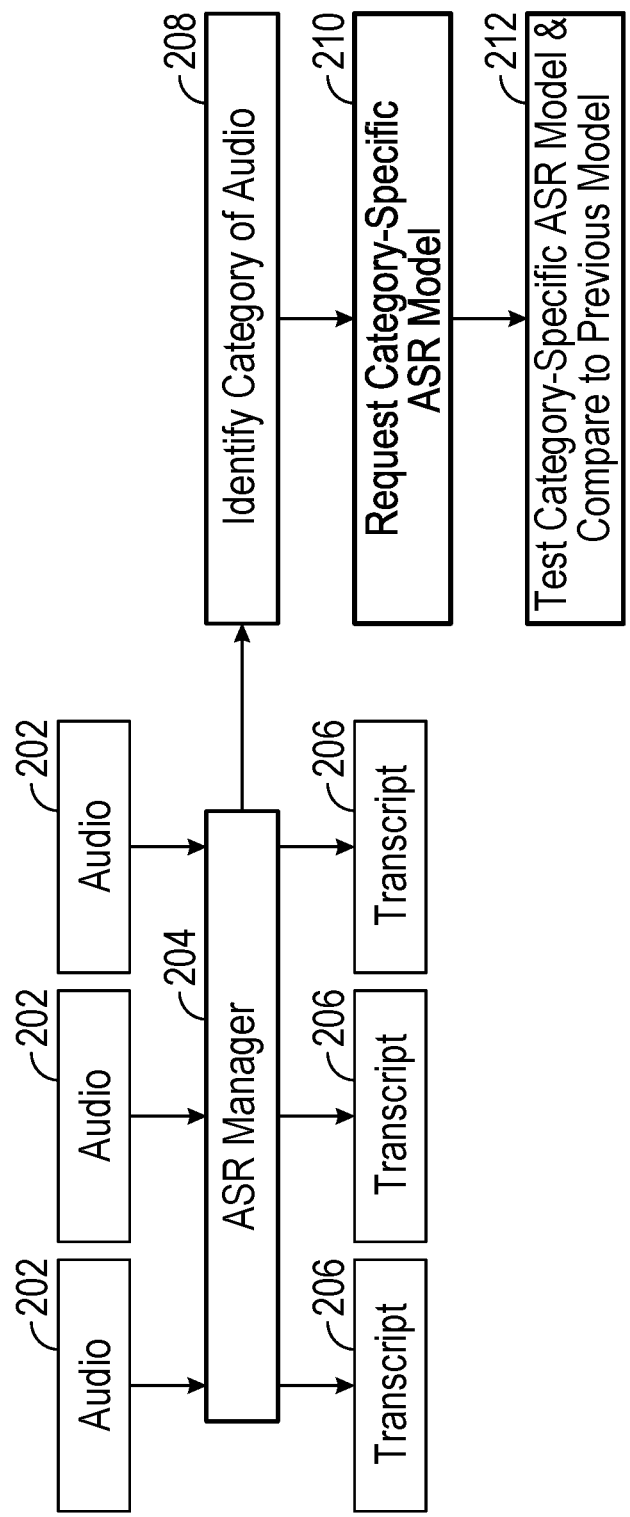
FIG. 2 illustrates an example process of identifying a need for a category-specific DSLM and testing that DSLM.

FIG. 2 illustrates an example process of identifying a need for a category-specific ASR model and testing that category-specific model. As illustrated, an ASR manager 204 receives audio 202 and directs the transcription generation process, selecting ASR models which best fit each piece of audio 202 received. In this example, the ASR manager 204 receives various pieces of audio 202, resulting in corresponding transcripts 206. However, in some instances the ASR manager 204 may receive audio 202 for which it does not have an adequate ASR model to use to generate a corresponding transcript 206. In such cases, the ASR manager 204 can identify a category of the audio 208 received and generate a request for a category-specific ASR model 210. That request can initiate the process illustrated in FIG. 1, with the system generating a new, category-specific ASR model (i.e., the specialized ASR model 116 illustrated in FIG. 1). Once completed, the category-specific ASR model can be tested and compared against one or more previous models 212. If the new, category-specific ASR model is sufficiently accurate, the ASR manager 204 can use the new, category-specific ASR model to generate transcripts 206 when that category of audio is identified in the future.

Figure 3:
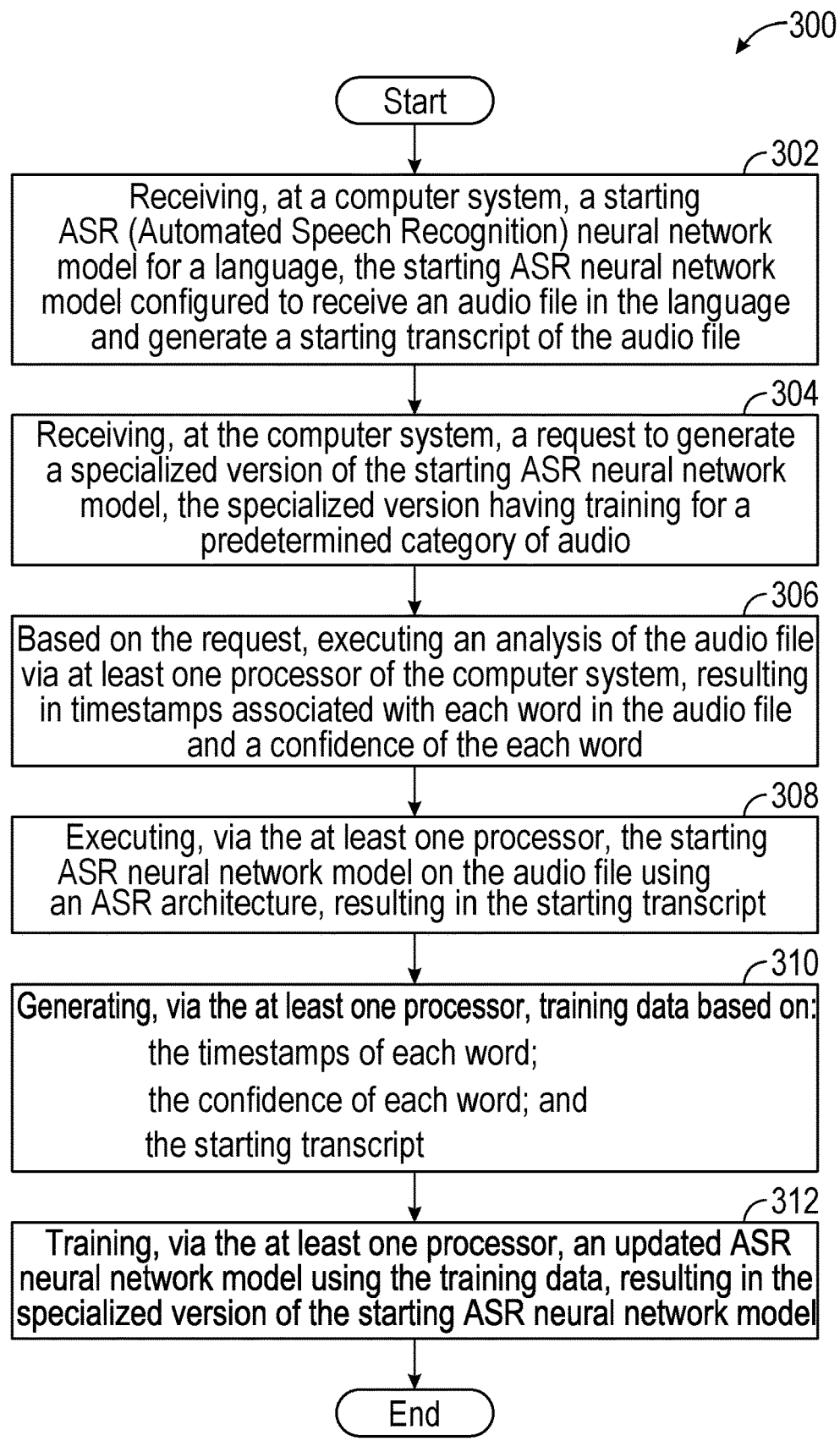
FIG. 3 illustrates an example method embodiment.

FIG. 3 illustrates an example embodiment. A system configured as disclosed herein can receive a starting ASR (Automated Speech Recognition) neural network model for a language, the starting ASR neural network model configured to receive an audio file in the language and generate a starting transcript of the audio file (302). The system can also receive a request to generate a specialized version of the starting ASR neural network model, the specialized version having training for a predetermined category of audio (304). Based on the request, the system can execute an analysis of the audio file via at least one processor of the computer system, resulting in timestamps associated with each word in the audio file and a confidence of the each word (306). The system can then execute the starting ASR neural network model on the audio file using an ASR architecture, resulting in the starting transcript (308), and generate training data based on: the timestamps of each word, the confidence of each word, the starting transcript (310). The system can then train an updated ASR neural network model using the training data, resulting in the specialized version of the starting ASR neural network model (312).

In some configurations, the audio file can include vocabulary from a predefined geographic region.

In some configurations, the audio file can include vocabulary from a specific domain.

In some configurations, the audio file can include words spoken with an accent. This accent can be a standard accent or non-standard accent.

In some configurations, the analysis of the audio file further results in, for each word in the audio file: the word in a string format; a speaker identification; and a paragraph indication; and the generating of the training data is further based on the word in the string format, the speaker identification, and the paragraph indication.

In some configurations, the generating of the training data can further include removing words with a confidence level below a predefined threshold.

In some configurations, the illustrated method can further include: executing, via the at least one processor, the updated ASR neural network model on additional audio.

Figure 4:
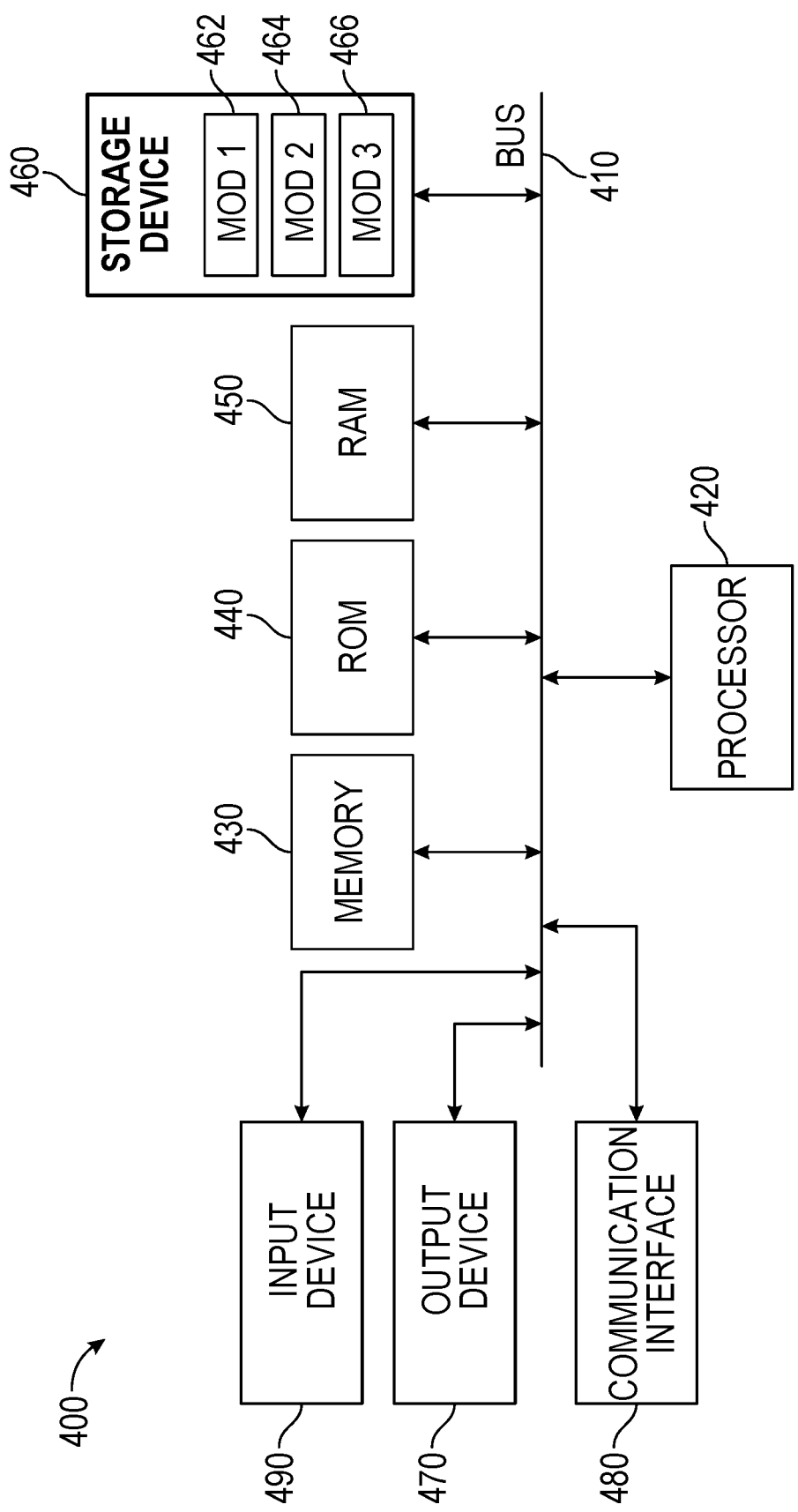
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random-access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general-purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, at a computer system, a starting ASR (Automated Speech Recognition) neural network model for a language, the starting ASR neural network model configured to receive an audio file in the language and generate a starting transcript of the audio file; receiving, at the computer system, a request to generate a specialized version of the starting ASR neural network model, the specialized version having training for a predetermined category of audio; based on the request, executing an analysis of the audio file via at least one processor of the computer system, resulting in timestamps associated with each word in the audio file and a confidence of the each word; executing, via the at least one processor, the starting ASR neural network model on the audio file using an ASR architecture, resulting in the starting transcript; generating, via the at least one processor, training data based on: the timestamps of each word; the confidence of each word; and the starting transcript; and training, via the at least one processor, an updated ASR neural network model using the training data, resulting in the specialized version of the starting ASR neural network model.

The method of any preceding clause, wherein the audio file comprises vocabulary from a predefined geographic region.

The method of any preceding clause, wherein the audio file comprises vocabulary from a specific domain.

The method of any preceding clause, wherein the audio file comprises words spoken with an accent.

The method of any preceding clause, wherein: the analysis of the audio file further results in, for each word in the audio file: the word in a string format; a speaker identification; and a paragraph indication; and the generating of the training data is further based on the word in the string format, the speaker identification, and the paragraph indication.

The method of any preceding clause, wherein the generating of the training data further comprises removing words with a confidence level below a predefined threshold.

The method of any preceding clause, further comprising: executing, via the at least one processor, the updated ASR neural network model on additional audio.

A system comprising: at least one processor; and a non-transitory computer-readable storage medium having instructions stored which, when executed by the at least one processor, cause the at least one processor to perform operations comprising: receiving a starting ASR (Automated Speech Recognition) neural network model for a language, the starting ASR neural network model configured to receive an audio file in the language and generate a starting transcript of the audio file; receiving a request to generate a specialized version of the starting ASR neural network model, the specialized version having training for a predetermined category of audio; based on the request, executing an analysis of the audio file, resulting in timestamps associated with each word in the audio file and a confidence of the each word; executing the starting ASR neural network model on the audio file using an ASR architecture, resulting in the starting transcript; generating training data based on: the timestamps of each word; the confidence of each word; and the starting transcript; and training an updated ASR neural network model using the training data, resulting in the specialized version of the starting ASR neural network model.

The system of any preceding clause, wherein the audio file comprises vocabulary from a predefined geographic region.

The system of any preceding clause, wherein the audio file comprises vocabulary from a specific domain.

The system of any preceding clause, wherein the audio file comprises words spoken with an accent.

The system of any preceding clause, wherein: the analysis of the audio file further results in, for each word in the audio file: the word in a string format; a speaker identification; and a paragraph indication; and the generating of the training data is further based on the word in the string format, the speaker identification, and the paragraph indication.

The system of any preceding clause, wherein the generating of the training data further comprises removing words with a confidence level below a predefined threshold.

The system of any preceding clause, the non-transitory computer-readable storage medium having additional instructions stored which, when executed by the at least one processor, cause the at least one processor to perform operations comprising: executing the updated ASR neural network model on additional audio.

A non-transitory computer-readable storage medium having instructions stored which, when executed by at least one processor, cause the at least one processor to perform operations comprising: receiving a starting ASR (Automated Speech Recognition) neural network model for a language, the starting ASR neural network model configured to receive an audio file in the language and generate a starting transcript of the audio file; receiving a request to generate a specialized version of the starting ASR neural network model, the specialized version having training for a predetermined category of audio; based on the request, executing an analysis of the audio file, resulting in timestamps associated with each word in the audio file and a confidence of the each word; executing the starting ASR neural network model on the audio file using an ASR architecture, resulting in the starting transcript; generating training data based on: the timestamps of each word; the confidence of each word; and the starting transcript; and training an updated ASR neural network model using the training data, resulting in the specialized version of the starting ASR neural network model.

The non-transitory computer-readable storage medium of any preceding clause, wherein the audio file comprises vocabulary from a predefined geographic region.

The non-transitory computer-readable storage medium of any preceding clause, wherein the audio file comprises vocabulary from a specific domain.

The non-transitory computer-readable storage medium of any preceding clause, wherein the audio file comprises words spoken with an accent.

The non-transitory computer-readable storage medium of any preceding clause, wherein:

the analysis of the audio file further results in, for each word in the audio file: the word in a string format; a speaker identification; and a paragraph indication; and the generating of the training data is further based on the word in the string format, the speaker identification, and the paragraph indication.

The non-transitory computer-readable storage medium of any preceding clause, wherein the generating of the training data further comprises removing words with a confidence level below a predefined threshold.

We claim:

1. A method comprising:
   receiving, at a computer system, a starting ASR (Automated Speech Recognition) neural network model for a language, the starting ASR neural network model configured to receive an audio file in the language and generate a starting transcript of the audio file;
   receiving, at the computer system, a request to generate a specialized version of the starting ASR neural network model, the specialized version having training for a predetermined category of audio;
   based on the request, executing an analysis of the audio file via at least one processor of the computer system, resulting in timestamps associated with each word in the audio file and a confidence of the each word;
   executing, via the at least one processor, the starting ASR neural network model on the audio file using an ASR architecture, resulting in the starting transcript;
   generating, via the at least one processor, training data based on:
   the timestamps of each word;
   the confidence of each word; and
   the starting transcript; and
   training, via the at least one processor, an updated ASR neural network model using the training data, resulting in the specialized version of the starting ASR neural network model.

2. The method of claim 1, wherein the audio file comprises vocabulary from a predefined geographic region.

3. The method of claim 1, wherein the audio file comprises vocabulary from a specific domain.

4. The method of claim 1, wherein the audio file comprises words spoken with an accent.

5. The method of claim 1, wherein:
the analysis of the audio file further results in, for each word in the audio file:
the word in a string format;
a speaker identification; and
a paragraph indication; and
the generating of the training data is further based on the word in the string format, the speaker identification, and the paragraph indication.

6. The method of claim 1, wherein the generating of the training data further comprises removing words with a confidence level below a predefined threshold.

7. The method of claim 1, further comprising:
executing, via the at least one processor, the updated ASR neural network model on additional audio.

8. A system comprising:
at least one processor; and
a non-transitory computer-readable storage medium having instructions stored which, when executed by the at least one processor, cause the at least one processor to perform operations comprising:
receiving a starting ASR (Automated Speech Recognition) neural network model for a language, the starting ASR neural network model configured to receive an audio file in the language and generate a starting transcript of the audio file;
receiving a request to generate a specialized version of the starting ASR neural network model, the specialized version having training for a predetermined category of audio;
based on the request, executing an analysis of the audio file, resulting in timestamps associated with each word in the audio file and a confidence of the each word;
executing the starting ASR neural network model on the audio file using an ASR architecture, resulting in the starting transcript;
generating training data based on:
the timestamps of each word;
the confidence of each word; and
the starting transcript; and
training an updated ASR neural network model using the training data, resulting in the specialized version of the starting ASR neural network model.

9. The system of claim 8, wherein the audio file comprises vocabulary from a predefined geographic region.

10. The system of claim 8, wherein the audio file comprises vocabulary from a specific domain.

11. The system of claim 8, wherein the audio file comprises words spoken with an accent.

12. The system of claim 8, wherein:
the analysis of the audio file further results in, for each word in the audio file:
the word in a string format;
a speaker identification; and
a paragraph indication; and
the generating of the training data is further based on the word in the string format, the speaker identification, and the paragraph indication.

13. The system of claim 8, wherein the generating of the training data further comprises removing words with a confidence level below a predefined threshold.

14. The system of claim 8, the non-transitory computer-readable storage medium having additional instructions stored which, when executed by the at least one processor, cause the at least one processor to perform operations comprising:
executing the updated ASR neural network model on additional audio.

15. A non-transitory computer-readable storage medium having instructions stored which, when executed by at least one processor, cause the at least one processor to perform operations comprising:
receiving a starting ASR (Automated Speech Recognition) neural network model for a language, the starting ASR neural network model configured to receive an audio file in the language and generate a starting transcript of the audio file;
receiving a request to generate a specialized version of the starting ASR neural network model, the specialized version having training for a predetermined category of audio;
based on the request, executing an analysis of the audio file, resulting in timestamps associated with each word in the audio file and a confidence of the each word;
executing the starting ASR neural network model on the audio file using an ASR architecture, resulting in the starting transcript;
generating training data based on:
the timestamps of each word;
the confidence of each word; and
the starting transcript; and
training an updated ASR neural network model using the training data, resulting in the specialized version of the starting ASR neural network model.

16. The non-transitory computer-readable storage medium of claim 15, wherein the audio file comprises vocabulary from a predefined geographic region.

17. The non-transitory computer-readable storage medium of claim 15, wherein the audio file comprises vocabulary from a specific domain.

18. The non-transitory computer-readable storage medium of claim 15, wherein the audio file comprises words spoken with an accent.

19. The non-transitory computer-readable storage medium of claim 15, wherein:
the analysis of the audio file further results in, for each word in the audio file:
the word in a string format;
a speaker identification; and
a paragraph indication; and
the generating of the training data is further based on the word in the string format, the speaker identification, and the paragraph indication.

20. The non-transitory computer-readable storage medium of claim 15, wherein the generating of the training data further comprises removing words with a confidence level below a predefined threshold.

* * * * *